Patented May 11, 1948

2,441,281

UNITED STATES PATENT OFFICE 2,441,281

TREATMENT OF SUGAR-CONTAINING LIQUIDS

John J. Naugle, New York, and Leonard Wickenden, Manhasset, N. Y., assignors, by direct and mesne assignments, of two-fifths to Andres Bay Trading Corporation, New York, N. Y., a corporation of New York, and two-fifths to Cuban Dominican Sales Corporation, New York, N. Y., a corporation of New York No Drawing. Application April 13, 1945,
Serial No. 588,264

6 Claims. (Cl. 127—50)

Our present invention relates to the treatment of sugar-containing liquids, and more particularly, to the purification, decolorization, and deodorization of cane and other sugar-bearing plant juices, fruit juices, raw sugar melts, and washed raw sugar melts, and constitutes a continuation-in-part of the co-pending application of John J. Naugle entitled "Treatment of sugar solutions," Serial No. 543,423, filed July 3, 1944, now Patent 2,422,699.

As stated in said co-pending application, clarification of the above-named liquids had before been accomplished by defecation with lime; but such clarification had been found lacking in that the colloidal materials, gums, waxes, and other color and odor-imparting substances normally present in such liquids were not removed to a sufficient degree. Furthermore, such clarification required elevation of the temperature of the liquid to a point which resulted in undue darkening; the normal ash content of the liquid was increased; and the muds thereof had a low filtration rate.

In order to eliminate these disadvantages, the above-mentioned applicant proposed a double defecation process which, briefly, consisted of the following:

To the sugar-containing liquids to which reference has been made, he added from about 1% to about 3%, based on the weight of the total sugar solids initially present, of a combination of the oxide and hydroxide of an alkaline earth metal, such as magnesium. Preferably, the hydroxide in the combination constituted about 2% thereof, although as high as 35% could be tolerated, depending upon the nature of the starting sugar-containing liquid and the degree of purity required of the end product.

After adding said oxide-hydroxide mixture, the liquid was heated to from about 77 degrees to about 79 degrees C. The heated liquid was settled and decanted, and the precipitates were filtered.

The pH of a liquid so treated was about 10.00, or slightly below. In order to bring the liquid substantially to neutrality, and to precipitate impurities therein, for example, as phosphates, a 10% phosphoric acid solution was added in an amount sufficient to attain said substantial neutrality. The liquid was then heated to about 83 degrees C., after which it was permitted to settle. The clear liquid was drawn off, and the muds filtered.

The end product of the foregoing process was a purified, clear, brilliant, light straw-colored liquid, with practically no undesirable odor, and having a fine flavor.

However, we have now found that an even superior and lower-cost product can be obtained by modifying the above-described process in accordance with the following:

Lime, when used as taught by the prior art as a defecant for raw sugar juice solutions, has a caustic effect on said solutions, gives low filtering rates, and causes darkening of the defecated juice. This seeming disadvantage notwithstanding, it appears that when calcium oxide is mixed with magnesium oxide in the proportions of from about 30 parts of calcium oxide or hydroxide and 70 parts of magnesium oxide to 1:1, and the combination is utilized in a process quite similar to that set forth in the co-pending application above referred to, we obtain, with about one-half the amount of defecant, results comparable to those obtained when using the magnesium oxide alone, and at a lower cost. Colloidal bodies, soluble and insoluble salts, as well as other suspended and dissolved impurities are removed.

While we do not wish to be restricted to any particular theory as to why this superior result is obtained, we believe that inasmuch as the efficient use of magnesium oxide as a purifying agent requires that the sugar-containing liquid being treated have a pH of about 9.7, and that when used alone, a large part of said magnesium oxide is actually wasted in attaining this alkaline condition, the addition of the calcium oxide relieves the magnesium oxide of this burden, itself raising the pH to the proper value, and permitting the magnesium oxide to devote itself more readily to the task of purification and decolorization. We further believe that when the calcium oxide does not exceed 50% of the mixture, the magnesium oxide acts as a protecting medium, and prevents caustic action on the liquid. Whatever the explanation, the end product is far superior to any heretofore obtained by lime defecation, the muds have an unusually high rate of filtration, the ash content is considerably reduced, and all these desirable results are obtained with far less defecant than is possible when magnesium oxide is used alone.

Referring now more in detail to the manner in which we avail ourselves of the above findings, we proceed by first preparing the magnesium oxide. Because this material readily absorbs moisture and carbon dioxide and, for best results, should be used dry and practically free of carbon dioxide, it is preferred that the preparation thereof take place as near before using as possible.

The magnesium oxide may be obtained by calcining the hydroxide or the carbonate recovered from magnesite, serpentine, and other silicate-bearing rocks; also, from dolomite, and from sea water.

While not limited thereto, the calcium-magnesium blend can be prepared by one of the following methods, which are given by way of example only.

Example 1.—When dolomite limestone is calcined, the resulting mixture of magnesium and calcium oxides occurs roughly in the proportions of one part magnesium to two parts calcium, the exact proportions varying with different limestones. Such a mixture of oxides is, for our purpose, too rich in lime. Therefore, in order to prepare a mixture of oxides containing the desired proportion of magnesium oxide, we mix with the limestone, prior to calcining, sufficient magnesite (native magnesium carbonate) to give from about 50% to about 70% of the calcined mixture in the form of magnesia. After calcination, the oxides exist in a rather heavy form, having relatively little activity for decolorizing and purifying sugar juices and similar liquids. To produce them in active form, they are hydrated by mixing with water, and then carbonated with carbon dioxide gas. Part of the resulting carbonates go into solution as bicarbonates but may be reprecipitated by boiling the solution. The mixed carbonates are filtered off, dried and calcined, and the oxides are then obtained in intimate mixture and in light and very active form.

Example 2.—Heavy magnesium oxide, obtained from sea water, is suspended in water and carbonated with carbon dioxide gas. Carbonation is continued until the pH is approximately 7.0 and any magnesia which goes into solution is recovered by boiling. The resulting light magnesium carbonate is filtered off, dried and calcined, yielding an active magnesium oxide. To this oxide is now added the desired proportion of freshly calcined calcium oxide, ground until it passes through 200 mesh. The two oxides are thoroughly mixed and are ready for use. In place of powdered calcium oxide, calcium hydrate may be used, but it is desirable that it should be dry and in a finely powdered condition, and as free as possible from carbonate.

With the above methods as examples, other procedures can be used to give similar results, and such procedures will be obvious to those familiar with the art.

This mixture of compounds is added to the liquid to be purified, which, as indicated, may be cane or other sugar-bearing plant juice, fruit juice, a raw sugar melt, or a washed raw sugar melt. The amount added should be from about 1% to about 1.25%, based on the weight of the total sugar solids in the starting liquid, or an amount sufficient to result in a liquid having a pH of about 10.00, or slightly higher.

It is preferred that the sugar-containing liquid be at room temperature during the addition of the magnesium-calcium combination, and it should be well stirred.

The liquid is then heated to from about 79 degrees to about 85 degrees C., the temperature being maintained at maximum for about 10 minutes. Within this range, and for such a time interval, no darkening occurs, and the precipitate obtained, which is flocculent and bulky, filters well. The liquid is settled and decanted, the muds are filtered, and the filtrate added to the clear liquid obtained from the decanting. This completes the first defecation.

It is now necessary to reduce the pH of the defecated liquid, which is about 10.00, substantially to neutrality. It is also necessary to precipitate therefrom impurities, for example, in the form of phosphates, or other insoluble compounds. For these purposes, a 10% solution of phosphoric acid, or any other solution capable of reducing the pH and producing insoluble precipitates, is added in an amount sufficient to lower the pH to from about 7.3 to about 6.9. The liquid is heated to about 83 degrees C., and is permitted to settle. The clear liquid is drawn off, and the muds are filtered, thus completing the second defecation.

The resulting end product is an unexpectedly clear, brilliant and light colored sugar-containing liquid, which is remarkably free of odor, and possesses a pleasant malt-like flavor. Sugar can be obtained therefrom polarizing at about 99.8 degrees.

While in describing our process, we have referred specifically to the oxides of magnesium and calcium, it is to be clearly understood that this is not intended as a limitation. The oxides of other alkaline earth metals may also be used, although we have not found them to be quite as effective.

This completes the description of our present invention. It will be noted from all of the foregoing that we have provided a simple and inexpensively practiced process whereby we are able to obtain a highly purified, decolorized and deodorized sugar-containing liquid directly from cane and other sugar-bearing plant juices, from fruit juices, from raw sugar melts, and from washed raw sugar melts.

Advantages of our present invention, in addition to those specifically referred to herein, will readily occur to those skilled in the art to which the same relates.

We claim:

1. The method of treating a sugar-containing liquid which includes the steps of: adding to said liquid from about 1% to about 1.25%, based on the weight of the total sugar solids in said liquid, of a mixture of the oxides of magnesium and calcium; said oxide of magnesium constituting from about 50% to about 70% of said mixture; removing from the liquid the resulting precipitate; and thereafter adjusting the pH of the liquid substantially to neutrality.

2. The method of treating a sugar-containing liquid which includes the steps of: adding to said liquid from about 1% to about 1.25%, based on the weight of the total sugar solids in said liquid, of a mixture of the oxide and hydroxide of magnesium, and the oxide of calcium; said magnesium oxide and hydroxide constituting from about 50% to about 70% of said mixture, and said hydroxide constituting from about 2% to about 35% of the magnesium oxide-hydroxide combination; removing from the liquid the resulting precipitate; and thereafter adjusting the pH of the liquid substantially to neutrality.

3. The method of treating a sugar-containing liquid which includes the steps of: adding to said liquid a sufficient quantity of a mixture of the oxide and hydroxide of magnesium, and the oxide of calcium to bring the pH of said liquid to from about 10.00 to about 10.5; said magnesium oxide and hydroxide constituting from about 50% to about 70% of said mixture, and said hydroxide constituting from about 2% to about 35% of the magnesium oxide-hydroxide combination; heating the liquid to from about 79 degrees to about 85 degrees C.; removing from the liquid the resulting precipitate; and thereafter adjusting the pH of the liquid substantially to neutrality.

4. The method of treating a sugar-containing liquid which includes the steps of: adding to said liquid from about 1% to about 1.25%, based on the weight of the total sugar solids in said liquid, of a mixture of the oxides of magnesium and calcium; said oxide of magnesium constituting from about 50% to about 70% of said mixture; removing from the liquid the resulting precipitate; adding phosphoric acid to the liquid to adjust the pH thereof to from about 6.9 to about 7.3; heating the liquid to about 83 degrees C.; and removing from the liquid the resulting precipitate.

5. The method of treating a sugar-containing liquid which includes the steps of: adding to said liquid from about 1% to about 1.25%, based on the weight of the total sugar solids in said liquid, of a mixture of the oxide and hydroxide of magnesium, and the oxide of calcium; said magnesium oxide and hydroxide constituting from about 50% to about 70% of said mixture, and said hydroxide constituting from about 2% to about 35% of the magnesium oxide-hydroxide combination; removing from the liquid the resulting precipitate; adding phosphoric acid to the liquid to adjust the pH thereof to from about 6.9 to about 7.3; heating the liquid to about 83 degrees C.; and removing from the liquid the resulting precipitate.

6. The method of treating a sugar-containing liquid which includes the steps of: adding to said liquid from about 1% to about 1.25%, based on the weight of the total sugar solids in said liquid, of a mixture of the oxide and hydroxide of magnesium, and the oxide of calcium; said magnesium oxide and hydroxide constituting from about 50% to about 70% of said mixture, and said hydroxide constituting from about 2% to about 35% of the magnesium oxide-hydroxide combination; heating the liquid to from about 79 degrees to about 85 degrees C.; removing from the liquid the resulting precipitate; adding phosphoric acid to the liquid to adjust the pH thereof to from about 6.9 to about 7.3; again heating the liquid to about 83 degrees C.; and again removing from the liquid the resulting precipitate.

JOHN J. NAUGLE.
LEONARD WICKENDEN.

REFERENCES CITED

The following references are of record in the file of this patent:

UNITED STATES PATENTS

| Number | Name | Date |
|---|---|---|
| 517,820 | Kolbig | Apr. 3, 1894 |
| 518,538 | Tiemann | Apr. 17, 1894 |
| 1,052,113 | Wiese | Feb. 4, 1913 |
| 1,233,919 | Rogan | July 17, 1917 |
| 2,071,776 | Teatini | Feb. 23, 1937 |
| 2,340,128 | Kent | Jan. 25, 1944 |

FOREIGN PATENTS

| Number | Country | Date |
|---|---|---|
| 190 | Great Britain | 1877 |